US 7,390,184 B2

(12) United States Patent
Keck et al.

(10) Patent No.: US 7,390,184 B2
(45) Date of Patent: Jun. 24, 2008

(54) DUAL INJECTION MANIFOLD (75) Inventors: Ed Keck, Leamington (CA); Dale E. Bridgen, Essex (CA)

(73) Assignee: Centoco Plastics Limited, Windsor, Ontario (CA)

( * ) Notice: Subject to any disclaimer, the term of this patent is extended or adjusted under 35 U.S.C. 154(b) by 295 days.

(21) Appl. No.: 11/269,935

(22) Filed: Nov. 9, 2005

(65) Prior Publication Data
US 2007/0104826 A1    May 10, 2007

(51) Int. Cl.
*B28B 13/00* (2006.01)
(52) U.S. Cl. .................. 425/130; 425/572; 425/588; 264/328.8; 264/328.12
(58) Field of Classification Search .............. 425/588, 425/572; 264/328.8, 328.12
See application file for complete search history.

(56) References Cited

U.S. PATENT DOCUMENTS

| | | | |
|---|---|---|---|
| 3,162,900 A | 12/1964 | Huelskamp | |
| 3,481,001 A | 12/1969 | Stillhard | |
| 3,530,539 A | 9/1970 | Gellert | |
| 3,751,203 A | 8/1973 | Hehl | |
| 3,797,808 A | 3/1974 | Ma et al. | |
| 3,836,301 A | 9/1974 | Hehl | |
| 3,909,173 A | 9/1975 | Latter | |
| 3,947,175 A | 3/1976 | Melcher | |
| 3,947,177 A | 3/1976 | Eckardt | |
| 4,005,961 A | 2/1977 | Manceau | |
| 4,052,497 A * | 10/1977 | Monnet | 264/255 |
| 4,243,362 A | 1/1981 | Rees et al. | |
| 4,268,240 A | 5/1981 | Rees et al. | |
| 4,279,582 A | 7/1981 | Osuna-Diaz | |
| 4,315,724 A | 2/1982 | Taoka et al. | |
| 4,334,847 A | 6/1982 | Schauffele | |
| 4,376,625 A | 3/1983 | Eckardt | |
| 4,381,272 A | 4/1983 | Ehritt | |
| 4,416,602 A | 11/1983 | Neumeister | |
| 4,470,936 A | 9/1984 | Potter | |
| 4,497,621 A | 2/1985 | Kudert et al. | |
| 4,501,550 A | 2/1985 | Nikkuni | |
| 4,542,054 A | 9/1985 | Fillmann | |
| 4,563,147 A | 1/1986 | Langecker | |
| 4,588,367 A | 5/1986 | Schad | |
| 4,643,659 A | 2/1987 | Paul | |
| 4,657,496 A | 4/1987 | Ozeki et al. | |
| 4,682,945 A | 7/1987 | Schad | |
| 4,701,292 A | 10/1987 | Valyi | |
| 4,712,990 A | 12/1987 | Kudert et al. | |
| 4,715,802 A | 12/1987 | Arai | |
| 4,717,324 A | 1/1988 | Schad et al. | |

(Continued)

*Primary Examiner*—Yogendra Gupta
*Assistant Examiner*—Maria Veronica D Ewald
(74) *Attorney, Agent, or Firm*—Carlson, Gaskey & Olds (57) ABSTRACT

A co injection manifold assembly for injecting two different materials into a common mold cavity includes a housing that defines a first passage, a second passage and an outlet. The first and second passages communicate with a bore having a valve member for controlling flow of the material through the outlet. A first temperature control element in thermal contact with the first passage and a second temperature control element are in thermal contact with the second passage. Each of the first and second temperature control elements are separately controllable to provide separate temperatures for each of the first and second passages. Separate temperatures in each of the first and second passages provide for the use of materials having dissimilar molten temperatures.

20 Claims, 8 Drawing Sheets

U.S. PATENT DOCUMENTS

| | | | |
|---|---|---|---|
| 4,749,554 | A | 6/1988 | Proksa et al. |
| 4,752,199 | A | 6/1988 | Arai |
| 4,775,308 | A | 10/1988 | Schad et al. |
| 4,789,318 | A | 12/1988 | Ehritt |
| 4,808,101 | A | 2/1989 | Schad et al. |
| 4,863,665 | A | 9/1989 | Schad et al. |
| 4,889,477 | A | 12/1989 | Wortberg et al. |
| 4,907,960 | A | 3/1990 | Hertzer |
| 4,931,234 | A | 6/1990 | Schad et al. |
| 4,944,909 | A | 7/1990 | Eckardt et al. |
| 4,994,220 | A | 2/1991 | Gutjahr et al. |
| 5,028,226 | A | 7/1991 | De'ath et al. |
| 5,040,963 | A | 8/1991 | Beck et al. |
| 5,069,612 | A | 12/1991 | Teutsch et al. |
| 5,074,772 | A | 12/1991 | Gutjahr |
| 5,076,776 | A | 12/1991 | Yamada et al. |
| 5,076,777 | A | 12/1991 | Schmitt |
| 5,078,589 | A | 1/1992 | Osuna-Diaz |
| 5,078,942 | A | 1/1992 | Sullivan et al. |
| 5,093,053 | A | 3/1992 | Eckardt et al. |
| 5,093,054 | A | 3/1992 | Hirota |
| 5,094,603 | A | 3/1992 | Gellert |
| 5,106,284 | A | 4/1992 | Kobayashi et al. |
| 5,125,817 | A | 6/1992 | Yamachika |
| 5,143,733 | A | 9/1992 | Von Buren et al. |
| 5,145,630 | A | 9/1992 | Schad |
| 5,149,547 | A | 9/1992 | Gill |
| 5,169,648 | A | 12/1992 | Eckardt et al. |
| 5,183,621 | A | 2/1993 | Yukihiro et al. |
| 5,186,954 | A | 2/1993 | Miyahara et al. |
| 5,200,207 | A | 4/1993 | Akselrud et al. |
| 5,206,032 | A | 4/1993 | Bock |
| 5,221,507 | A | 6/1993 | Beck et al. |
| 5,223,275 | A | 6/1993 | Gellert |
| 5,238,378 | A | 8/1993 | Gellert |
| 5,256,051 | A | 10/1993 | Langos et al. |
| 5,316,583 | A | 5/1994 | Milliman |
| 5,368,470 | A | 11/1994 | Manner |
| 5,378,139 | A | 1/1995 | Schad et al. |
| 5,380,184 | A * | 1/1995 | Von Holdt, Sr. ............. 425/547 |
| 5,383,257 | A | 1/1995 | Krauss |
| 5,385,461 | A | 1/1995 | Machida |
| 5,417,558 | A | 5/1995 | Heindel et al. |
| 5,460,771 | A | 10/1995 | Mitchell et al. |
| 5,466,141 | A | 11/1995 | Eckardt et al. |
| 5,523,045 | A | 6/1996 | Kudert et al. |
| 5,531,581 | A | 7/1996 | Donnell, Jr. |
| 5,556,582 | A | 9/1996 | Kazmer |
| 5,595,799 | A | 1/1997 | Beck et al. |
| 5,599,568 | A | 2/1997 | Donnell, Jr. |
| 5,601,773 | A | 2/1997 | Schmidt et al. |
| 5,650,178 | A | 7/1997 | Bemis et al. |
| 5,891,381 | A | 4/1999 | Bemis et al. |
| 6,440,350 | B1 | 8/2002 | Gellert et al. |
| 6,640,349 | B2 | 11/2003 | Toldo et al. |
| 2002/0079603 | A1 | 6/2002 | Bemis et al. |
| 2003/0209833 | A1 | 11/2003 | Bemis et al. |
| 2004/0109916 | A1 | 6/2004 | Babin |
| 2004/0178534 | A1 | 9/2004 | Puniello et al. |
| 2004/0180734 | A1 | 9/2004 | Puniello et al. |
| 2006/0113710 | A1* | 6/2006 | Bemis et al. ............. 264/328.8 |

* cited by examiner

DUAL INJECTION MANIFOLD

BACKGROUND OF THE INVENTION

This invention relates generally to an injecting unit for a molding machine and more particularly to a co-injecting unit for forming a molded article having an inner core and an outer skin.

A co-injection manifold is typically provided for a molding machine in which a core material and a skin material are concurrently injected into a mold cavity. The core material is typically a different material than the outer skin material. In some instances it may be desirable to use better quality plastic material as the observable outer surface or skin material and a cheaper lesser grade material as the non-visible core material.

Conventional co-injection manifolds include at least two inlets that feed a common outlet leading to the mold cavity. A valve and nozzle control the flow of each material through the outlet and into the mold. The valve provides the desired material flow into the mold and selectively shuts off flow of the core material such that the entire surface of a molded article is comprised of the desired outer skin material.

Co-injection manifolds typically utilize a similar grade of plastic materials that have similar melting temperatures. It is known to provide temperature control elements within a co-injection manifold to maintain the plastic material at a desired temperature. Plastic materials generally melt and are molded at similar temperatures and therefore the co-injection manifold is heated to a single common temperature.

Disadvantageously, separate or drastically different materials may require different temperatures. For example, recent developments utilize a wood or other cellulose material as the core for the molded article. The wood core material provides several benefits that provide advantages to the completed molded article. However, the wood material is not compatible with temperatures that are favorable to plastic material.

Accordingly, it is desirable to develop a co-injection manifold that provides separate temperature controls to provide for co-injection of a wood or other cellulose material and a plastic material through a common injection manifold.

SUMMARY OF THE INVENTION

An example co-injection manifold according to this invention includes a first passage and a second passage for communicating dissimilar materials through an outlet. The manifold assembly includes separately controllable temperature control elements to independently control a temperature within each of the first and second passages.

An example co-injection manifold assembly according to this invention provides for the injection of dissimilar materials that require different temperatures to maintain a desired molten state. An example of dissimilar materials is the use of a plasticized wood or other cellulose materials as the core. The core material is injected through the inlet and into the mold cavity. The skin material that is injected through the inlet is comprised of a plastic material. The skin material and the core material remain in a desired molten state at different temperatures. The core material may not be heated to the same temperatures as the plastic outer skin material as such temperature may cause clogging or degradation of the core material. The temperatures required to maintain the skin material in a molten state is higher than is desired and preferable for the core material.

First temperature control elements and second temperature control elements are controlled to provide separate control over the temperatures of the first passage and the second passage. The separately controllable first and second temperature control elements provide for the use of dissimilar materials in the co-injection molding process. In this way the co-injection manifold according to this invention provides for the use of a plastic material utilized as the skin, and a wood material utilized as the core of a desired molded article in a co-injection molding process.

The co-injection manifold includes and regulates the flow of the core material and the skin material by way of a valve pin. The valve pin is moveable axially within the bore by way of a plunger. An actuator activates the plunger providing axial movement of the valve pin within the bore for selective closing and opening of the passages that communicate material between the inlets and the outlet.

Another example manifold assembly according to this invention includes a valve pin that moves axially and radially within the bore. The valve pin includes a radial surface that cooperates with the inner surface of the bore to shut off flow of material. Another radial portion of the valve pin is spaced apart from the inner surface of the bore to allow material flow to the outlet. Incremental rotation of the valve pin provides selective control of material flow for the core and skin materials during the molding process.

Another example manifold assembly includes a valve block that is moveable within a channel. Movement of the valve block within the channel selectively communicates material flowing from the passages to the outlet. The valve block includes a combined passage that provides for communication of material from both the second passage and the first passage to the outlet, and a single passage for the flow of skin material only. The valve block also includes a shutoff position where all flow is closed off.

Another example manifold assembly includes a first valve within the first passage and a second valve within the second passage. The first and second valves are independently controllable to selectively control and shut off the flow of different materials into the mold cavity.

The manifold assembly of this invention provides for the concurrent injection of a core material with a different molten temperature than a skin material to provide a molded article with the desirable features of the core and outer skin.

These and other features of the present invention can be best understood from the following specification and drawings, the following of which is a brief description.

DETAILED DESCRIPTION OF THE PREFERRED EMBODIMENT

Figure 1:
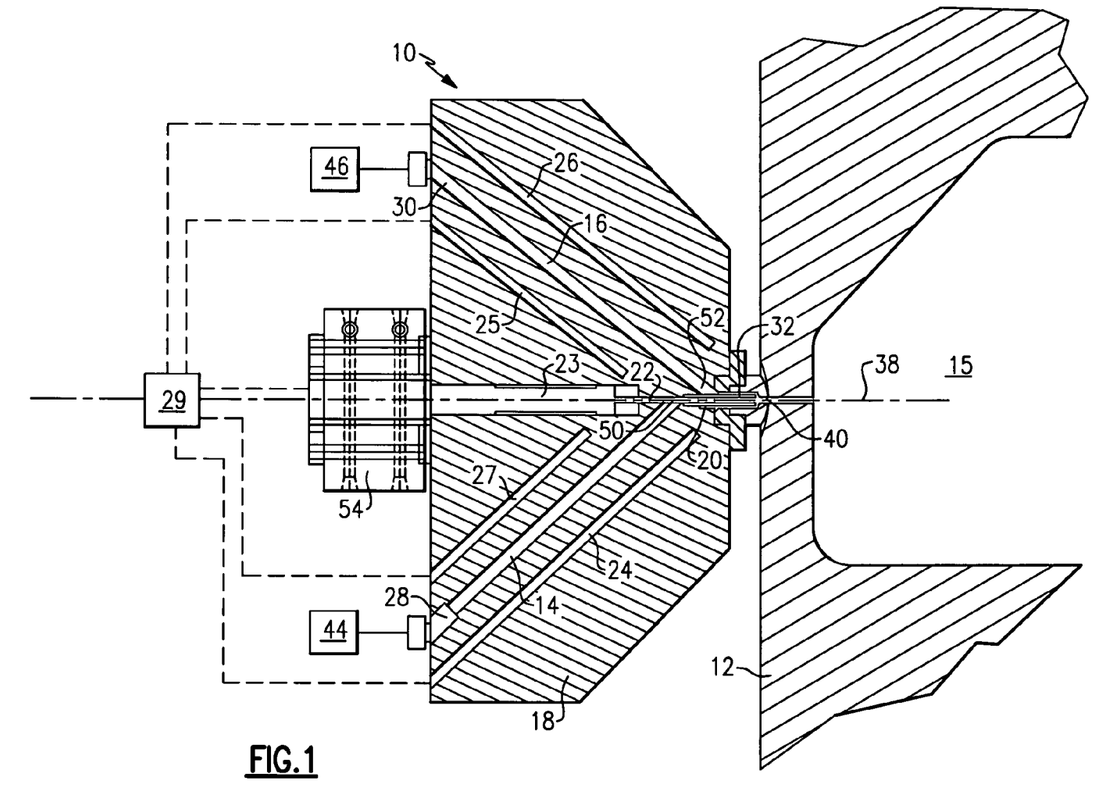
FIG. 1 is a cross-sectional view of an example co-injection manifold according to this invention.

Referring to FIG. 1, a co-injection manifold assembly 10 includes a first passage 14 and a second passage 16. The first passage 14 and the second passage 16 communicate material from first inlet 28 and second inlet 30 to an outlet 40. Material flows through the outlet 40 into a mold cavity 15 of a mold tool 12. The mold tool 12 can include multiple cavities 15 into which material is injected simultaneously or incrementally. The first and second passages 14, 16 and a bore 20 are defined within a housing 18. The bore 20 is disposed along an axis 38 common with the outlet 40.

The manifold assembly 10 according to this invention provides for the injection of a core material 44 and a skin material 46. The second skin material 46 is injected first, followed by the core material 44. The core material 44 and skin material 46 are injected into the same mold cavity 15 to provide the desired configuration of a completed molded article. The skin material 46 is injected into the cavity first, and then the core material 44 is injected into the skin material 46 inside the cavity 15. Once the cavity 15 is almost filled, a small amount of skin material 46 is again injected to clean out the outlet 40 for the next part so that no core material 44 is visible to contaminate the show surface of a completed molded article.

The mold tool 12 may include the single cavity 15 or multi-cavities such that the core material 44 and the skin material 46 can be injected into each of the cavities concurrently. Concurrent injection into several different mold cavities 15 can be accomplished by providing corresponding runners within the mold tool 12, or by including dual nozzles for the manifold assembly 10. As appreciated, a worker skilled in the art would understand that the number of mold cavities into which the core and skin materials are injected could be configured according to application specific parameters. Such multi-cavity mold tools 12 can be used to fabricate several identical molded articles, or may be used to fabricate several corresponding parts of a set or molded assembly. In any such configuration, the manifold assembly 10 provides for the co-injection of the skin material 46 and the core material to produce a desired as molded appearance of a completed molded article.

The example manifold assembly 10 provides for the injection of dissimilar materials that require different temperatures to maintain a desired molten state. An example of dissimilar materials is the use of a plasticized wood or other cellulose material as the core material 44. The term wood material as used in this disclosure refers to wood flour, hemp, and other cellulous materials that are injected into a mold cavity. The plasticized wood material is injected through the inlet 28 and into the mold cavity 15. The skin material that is injected through the inlet 30 is comprised of a plastic material. The plastic material and the wood core material remain in a desired molten state at different temperatures. The wood material may not be heated to the same temperatures as the plastic outer skin material as such an elevated temperature may cause degradation of the wood material. The temperatures required to maintain the plastic material in a molten state is higher than is desired and preferable for the wood material.

The manifold assembly 10 of this invention includes first temperature control elements 24, 27 and second temperature control elements 25, 26. A controller 29 provides for the separate control of each of the first temperature control elements 24, 27 and the second temperature control elements 24, 27. The first temperature control elements 24, 27 are disposed in thermal contact with the first passage 14 to provide for control of the temperature of the first passage 14 and material remaining in the first passage between molding cycles.

The second temperature control elements 25, 26 are controllable separately from the first temperature control elements 24, 27 such that the skin material may be maintained at a higher temperature than the core material within the first passage 14. The separately controllable first and second temperature control elements 24, 27, 25, 26 provide for the use of dissimilar materials in the co-injection molding process. As appreciated wood material may even need to be cooled rather than heated when utilized and flowed through the manifold assembly 10. In this way the co-injection manifold 10 according to this invention provides for the use of a plastic material utilized as the skin, and a wood material utilized as the core of a desired molded article in a co-injection molding process.

The first temperature control elements 24, 27, comprise water lines through which a coolant such as water or other coolant is flowed to stabilize the temperature of the core material 44 through the passage 14. The second temperature control elements 25, 26 comprise an electrically powered element that is controlled by the controller 29 to maintain a desired temperature within the housing 18 adjacent and within the first passage 14. Although an electrically powered element is discussed and shown, it is within the contemplation of this invention to utilize other independently controllable devices for controlling the temperature in the first passage 14 and the second passage 16.

The co-injection manifold includes and regulates the flow of the wood material and the plastic material by way of a valve pin 22. The valve pin 22 is moveable axially within the bore 20 by way of a plunger 23. An actuator 54 activates the plunger 23. Providing axial movement of the valve pin 22 within the bore 20 provides for the selective closing and opening of the passages 14 and 16 that communicate material between one of the inlets 28, 30 and the outlet 40. Material flowing from each of the passages 14, 16 intersects the bore 20 and flows around or through a nozzle 32. The nozzle 32 ensures that the skin material and the core material are not mixed prior to exiting the outlet 40 and entering the mold cavity 15. The nozzle 32 defines the flow of the skin material such that the core material remains within a central portion of molten fluid flow injected into the mold cavity 15.

The valve pin 22 moves axially within the bore 20 to close off openings 50 and 52 in a selective manner. Axial movement of the valve pin 22 within the bore 20 first closes off the core material flowing through the first passage 14 and exiting the first opening 50. This provides for the separation of the core material and stoppage of flow of the core material prior to stopping the flow of the skin material that is flowing through the second passage 16 and exiting into the bore 20 through a second opening 52. In this way a molded article formed in the cavity 15 will include a substantially common and finished outer surface. This substantially finished and common outer surface will not include inconsistencies possibly caused by a sprue containing core material.

Figure 2:
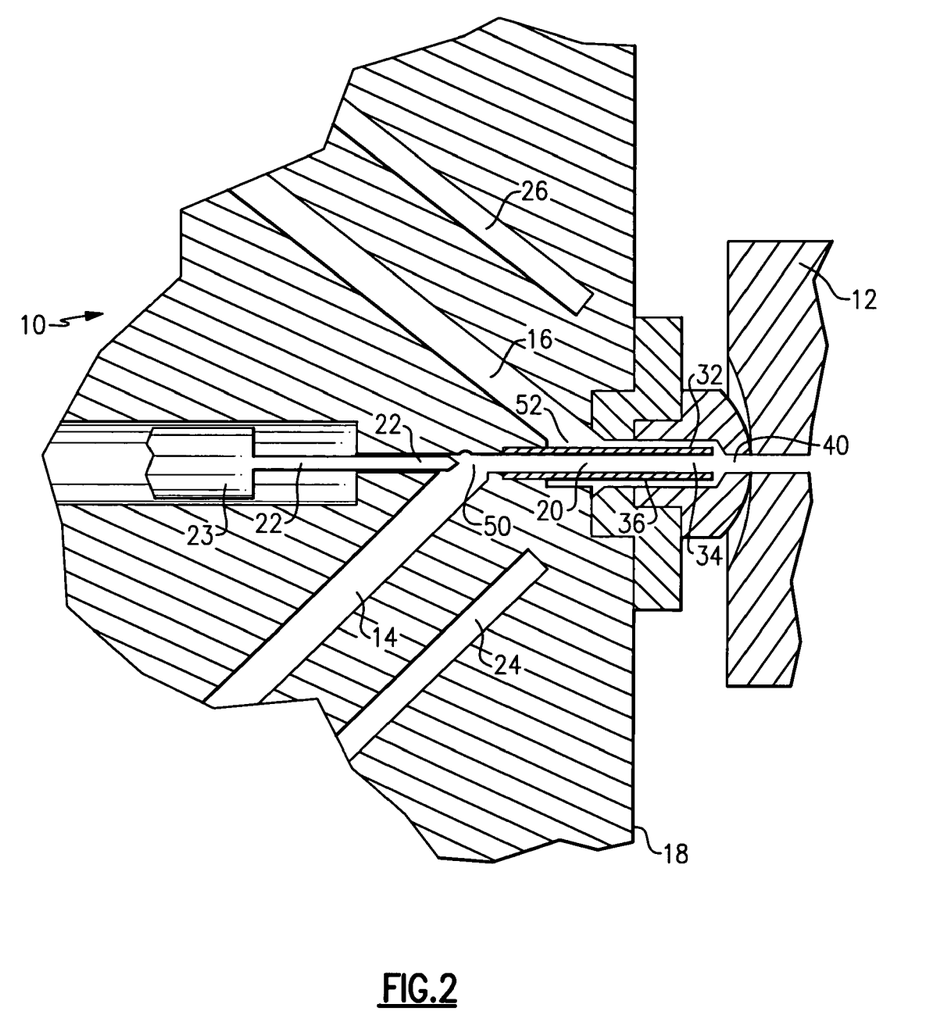
FIG. 2 is an enlarged cross-sectional view of an example valve pin and nozzle in an open position.

Referring to FIG. 2 with continuing reference to FIG. 1, the valve pin 22 is shown in a position within the bore 20 that does not block either the first opening 50 or the second opening 52. In this position material flows both from the first passage 14 and from the second passage 16 freely into the mold cavity 15. The core material 44 will flow into the bore 20 and through an interior bore 34 of the nozzle 32. The interior bore directs core material 44 directly along the axial portion of the bore 20, through the outlet 40 and into the mold cavity 15. Material flowing from the second passage 16 flows into the bore 20 and around the nozzle 32 within an outer bore 36. The outer bore 36 is concentric about the nozzle 32 to encase a flow field comprised of the core material 44. This configuration produces a flow out of the outlet 40 comprising an inner flow field of core material and an outer flow field surrounding the outer core material that comprises the skin material 46.

Use of some materials as the core material 44 is only practical if the core can be maintained at a temperature that will allow its free flow while not degrading the core material. As appreciated, degradation of the core material can result in undesirable build up within the co-injection manifold 10 that could degrade the molding process. However, the entire co-injection manifold 10 cannot be maintained at the lower temperature required for the core material. Therefore, the skin material is run through another portion of the co-injection manifold assembly 10 that is maintained at a second temperature.

Figure 3:
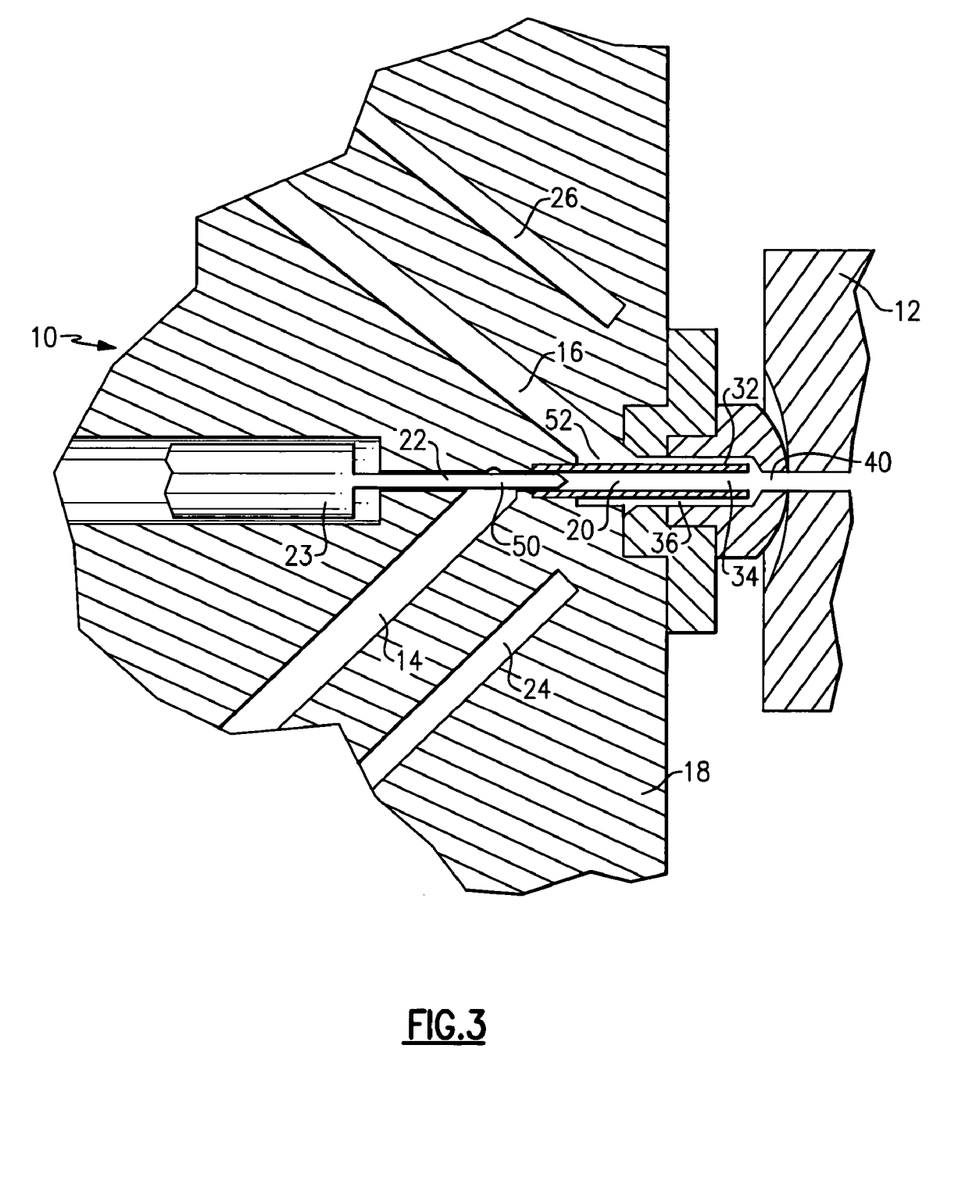
FIG. 3 is an enlarged cross-sectional view of an example valve pin and nozzle in a position closing off material from one inlet.

Referring to FIG. 3, the valve pin 22 is shown in an intermediate position blocking flow of core material 44 which is in the first passage 14 from entering the bore 20. In this position no core material 44 is able to enter the bore 20. However, the pin 22 is not moved further within the bore 20 to block flow of the skin material 46 flowing through the second passage 16. In this way the skin material can completely encase the core material.

Figure 4:
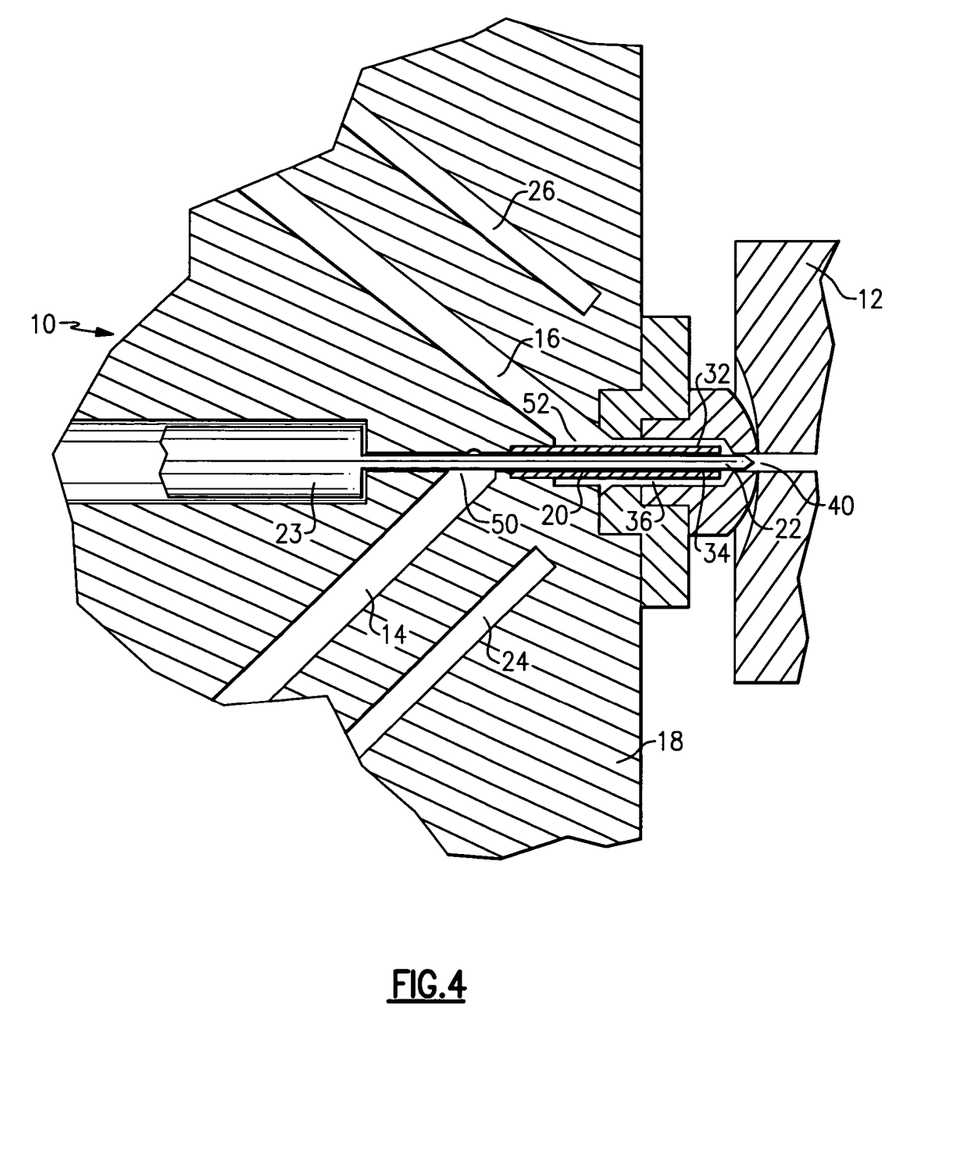
FIG. 4 is an enlarged cross-sectional view of an example valve pin and nozzle in a position closing off material flow from both inlets.

Referring to FIG. 4, the valve pin 22 is shown in a position that closes off all material to complete the filling of the cavity 15. In this position both the plastic material flowing through the second passage 16 and the wood material flowing through the passage 14 are closed off. This position is provided when the mold cavity 15 is completely filled. The valve pin 22 is moved within the bore 20 by way of the plunger 23 and the actuator 54. The actuator 54 is controlled by the controller 29 (Best shown in FIG. 1) to provide desired movement of the valve pin 22 through the bore 20 to selectively close off the flow of core material and the plastic skin material at a desired time.

The manifold assembly 10 of this invention provides for the introduction and injection of a core material along with plastic skin material in a common manifold by including separately controllable temperature control elements disposed in thermal contact with the first passage 14 and the second passage 16.

Figure 5:
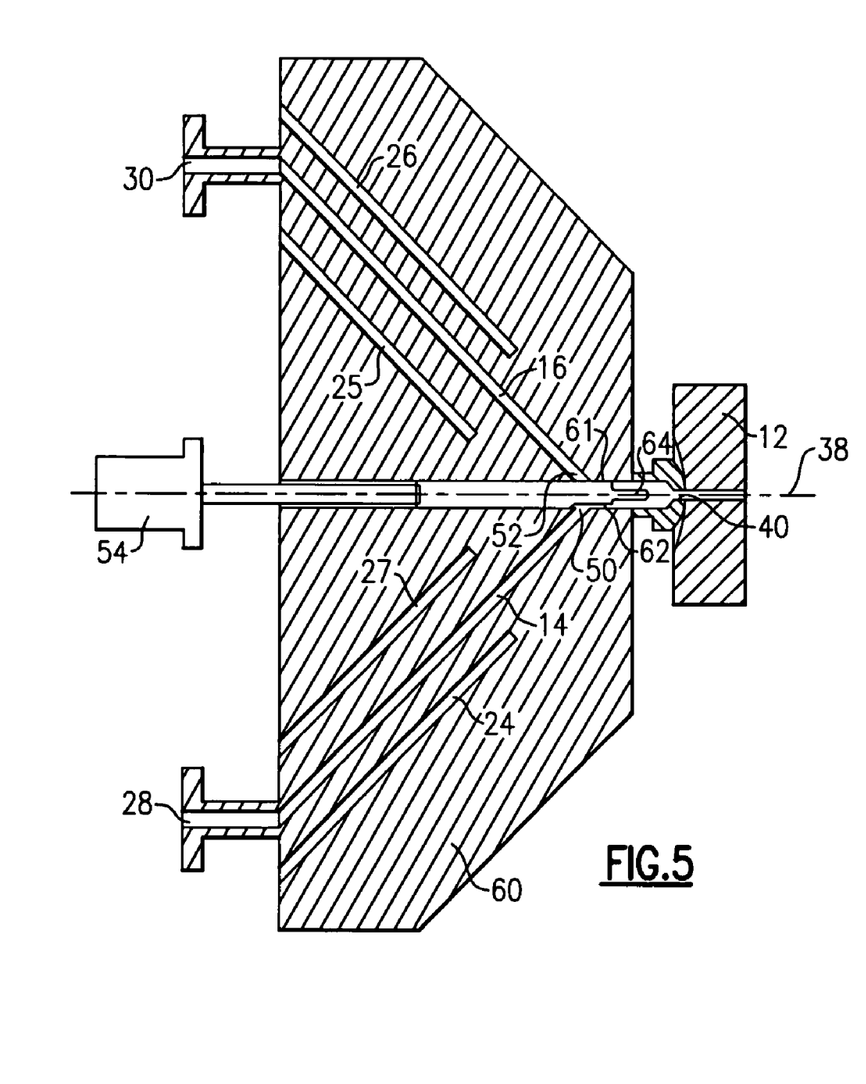
FIG. 5 is a cross-sectional view of another co-injection manifold according to this invention.

Referring to FIG. 5, another example manifold assembly 60 according to this invention includes a valve pin 62 that moves axially within bore 20 and also moves radially within the bore 20. The manifold assembly 60 includes the first passage 14 and the second passage 16. The first temperature control elements 27, 24 are disposed in thermal contact with the first passage 14. The second temperature control elements 25, 26 are disposed in thermal contact with the second passage 16. The first and second temperature control elements 27, 24, 25, 26 are separately controllable to provide different temperatures within each of the first passage 14 and the second passage 16. Control of the temperature within the first passage 14 and the second passage 16 independent of each other provide for the use of dissimilar materials for the core and the outer skin.

The valve pin 62 of the manifold assembly 60 rotates along the axis 38 to provide for the collective opening and flow control of material flown the first passage 14 and the second passage 16. The valve pin 62 also includes an outlet shut off portion 64. The outlet shut off portion 64 is moveable axially into the outlet 40 to shut off flow between both the first passage 14 and the second passage 16. The outlet shut off portion 64 also provides a cleaning function for cleaning any residual material that may have accumulated during processing.

Referring to FIGS. 6-9, rotation of the valve pin 62 provides for the selective control of material flowing from each of the first passage 14 and the second passage 16. Rotation of the valve pin 62 in desired increments provides for the selective opening and closing of material flowing through the bore 20. The irregular shape provides for an outer radial surface that cooperates with the inner wall of the bore 20 to provide a shut off function. The radial surface includes an open portion 68 and a closed portion 66. The open portion provides for flow around the valve pin 62 and into the bore 20.

Figure 6:
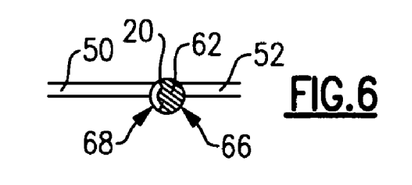
FIG. 6 is an enlarged view of an example valve pin in a first position.

Referring to FIG. 6, the valve pin 62 is rotated in a position that allows flow to enter the bore 20 from the first passage 14 through the first opening 50. As is shown the valve pin 62 includes a radial surface 66 that includes the shut off portion 66 and the open portion 68. The open portion 68 is comprised of a substantially concave region formed by a surface recessed from an inner wall of the bore 20.

Figure 7:
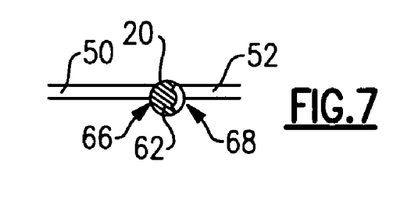
FIG. 7 is an enlarged view of an example valve pin in a second position.

Referring to FIG. 7, the valve pin 62 is shown in a second position where the open portion 68 is disposed adjacent the second opening 52 to allow flow of the skin material 46 into and out the outlet 40. The shut off portion 66 is disposed adjacent the first opening 50 to prevent the flow of core material. This position is utilized at the end and beginning of a mold cycle.

Figure 8:
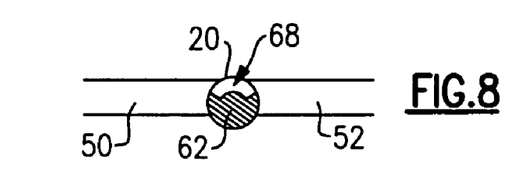
FIG. 8 is an enlarged view of an example valve pin in a third position.

Referring to FIG. 8, the valve pin 62 is rotated into a third position where the open portion 68 is disposed such that the first opening 50 and the second opening 52 are open to the bore 20 and allows flow of both the core material and the skin material into and out the outlet 40. This position is used during the molding operation to inject a combined flow field of molten material including the core material surrounded by the skin material.

Figure 9:
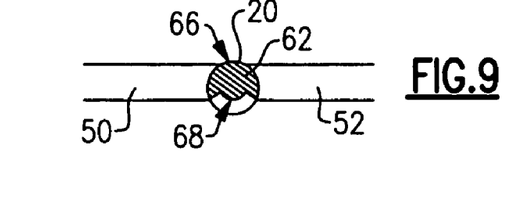
FIG. 9 is an enlarged view of an example valve pin in a fourth position.

Referring to FIG. 9, the valve pin 62 is shown in a closed position where the shut off portion 66 is disposed such that it blocks both the first opening 50 and the second opening 52 to prevent the flow of any material from the inlets to the outlet 40.

Referring back to FIG. 5, the manifold assembly 60 provides a rotating valve pin 62 for controlling and adjusting a stream of core and skin material to control the molding process and filling of a mold cavity. The stream of core and skin material is controlled by selectively rotating the valve pin 62 to selectively block passages for the core and skin material. The manifold assembly 60 includes separately controlled temperature control elements 24, 27, 25, 26, providing for the use of dissimilar materials in the co-injection molding process.

Figure 10:
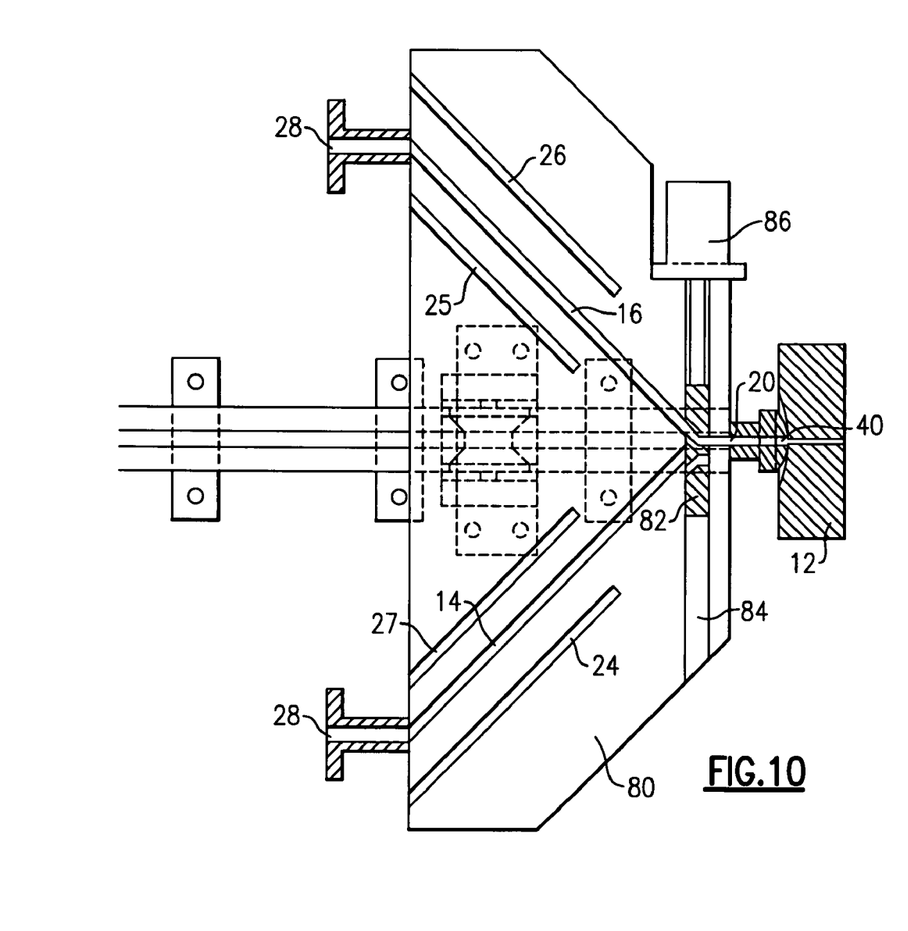
FIG. 10 is a cross-sectional view of another co-injection manifold according to this invention.

Referring to FIG. 10, another example manifold assembly 80 includes a valve block 82 that is moveable within a channel 84. The channel 84 is disposed transverse to the bore 20. Movement of the valve block 82 within the channel 84 selectively communicates material flowing from the first passage 14 and the second passage 16 to the outlet 40. The valve block 82 includes combined passage 88 that provides for communication of material from both the second passage 16 and the first passage 14 to the outlet 40. The combined passage 88 is Y-shaped to provide material flow from both the first passage and the second passage 16. The valve block 82 is slidable within the channel 84 by way of an actuator 86. The actuator 86 is controlled to selectively controlling the flow of core material through the first passage 14 and skin material through the second passage 16.

Figure 11:
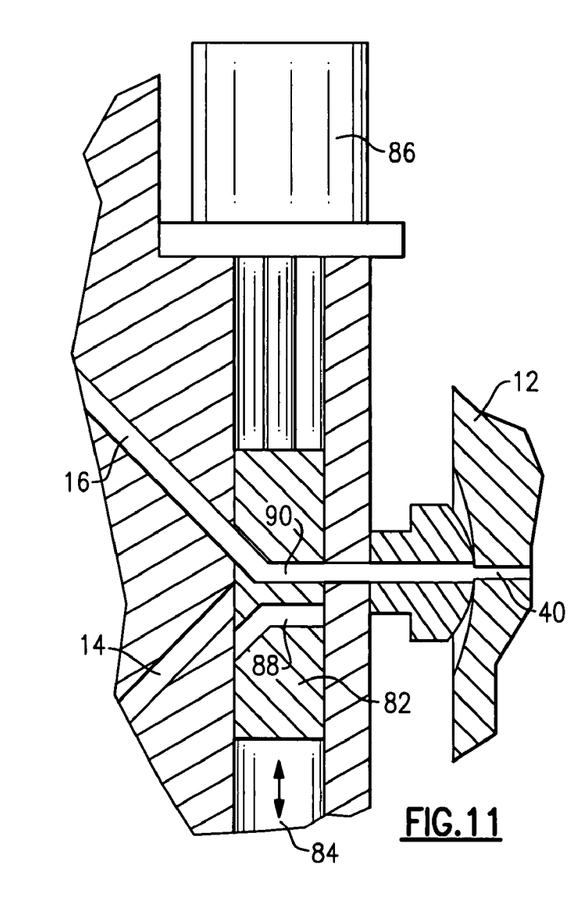
FIG. 11 is an enlarged cross-sectional view of a valve-block according to this invention.

Referring to FIG. 11, the valve block is shown in a position where the first passage 14 is blocked and flow is provided and allowed through the second passage 16 through the single passage 90 of the valve block 82. In this position only skin material flowing through the second passage 16 is allowed to enter the outlet 40.

Figure 12:
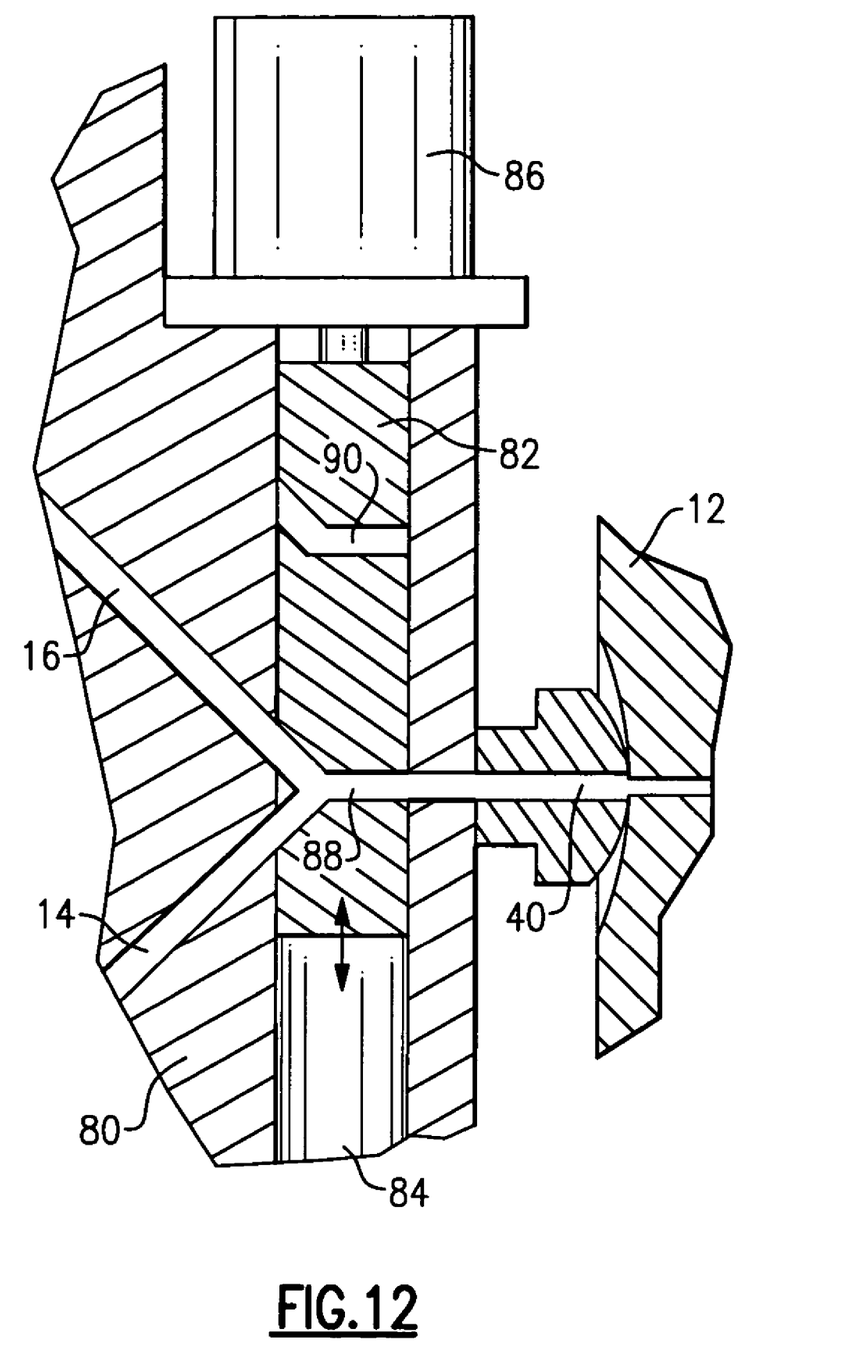
FIG. 12 is another enlarged cross-sectional view of the valve block according to this invention.

Referring to FIG. 12, the valve block 82 is shown in a position providing for the flow of material from the first passage 14 and from the second passage 16. In this position the combined passage 88 is aligned with both the first passage 14 and the second passage 16 to provide for the free flow of material through the outlet 40 and into the mold cavity 15. The free flow of material includes a core material and a skin material. The manifold assembly 80 includes the first temperature control elements 25, 26 (Shown in FIG. 1) that provide for the selective temperature control of the first passage 14 and the second passage 16. Use of the valve block 82 provides simple and effective selective control of the material flow into the mold cavity 15. The manifold assembly 80 includes separate distinctly controlled temperature controlled passages that provide the desired individual temperature control to allow the use of a wood core material and a plastic skin material.

Figures 13, 14, 15:
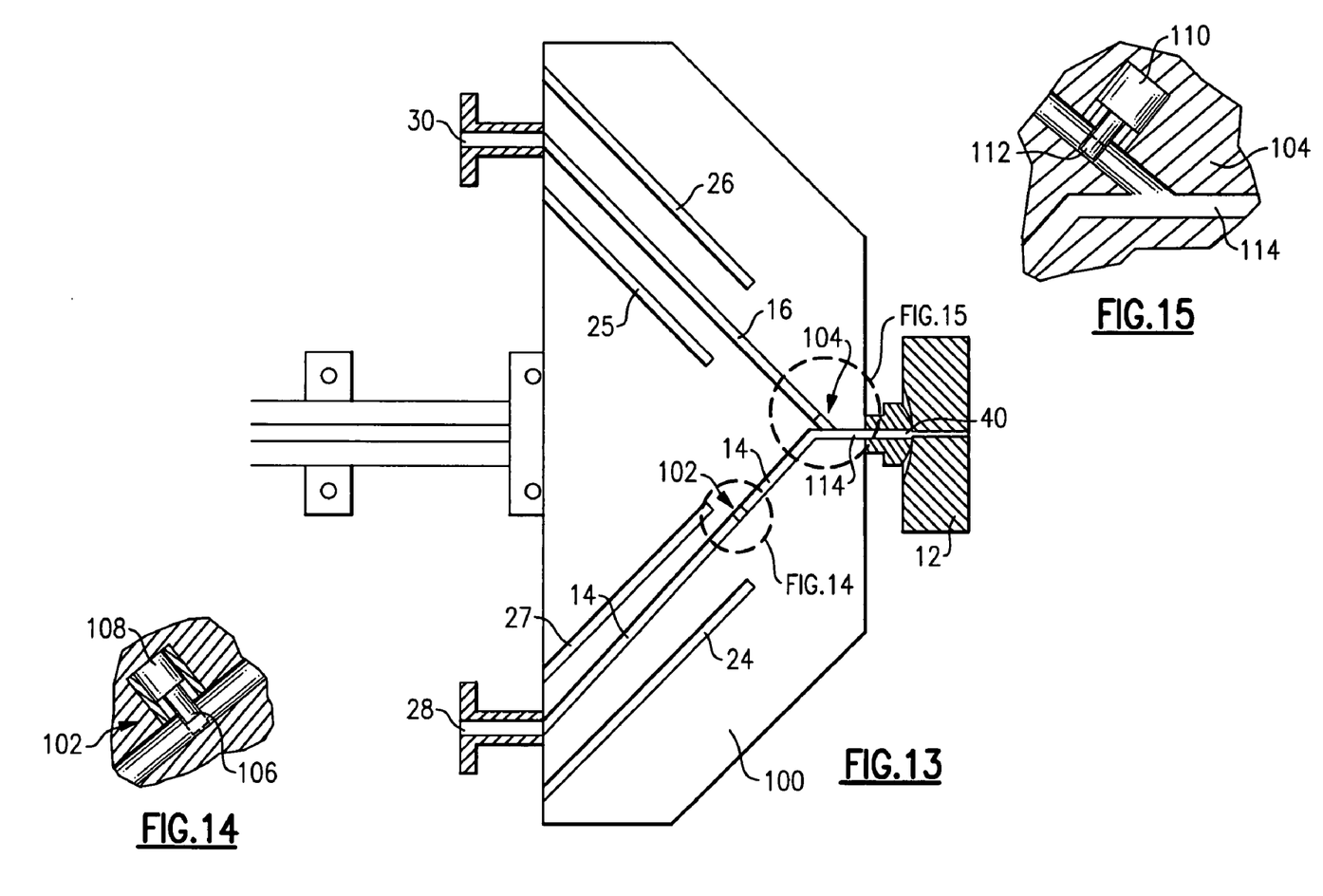
FIG. 13 is a cross-sectional view of another co-injection manifold according to this invention.
FIG. 14 is an enlarged cross-sectional view of a first valve according to this invention.
FIG. 15 is an enlarged cross-sectional view of a second valve according to this invention.

Referring to FIG. 13, another example manifold assembly 100 includes a first valve 102 disposed in the first passage 14 and a second valve 104 disposed in the second passage 16. The first passage 14 includes the first temperature control elements 24 and 27 (Shown in FIG. 1) provide for the regulation of temperature of the passage 14 and thereby the temperature of molten material traveling therethrough. The second passage 16 is disposed adjacent second temperature control elements 25 and 26 (as shown in FIG. 1) that provide for the separate and independent control of the material passing through the second passage 16.

The manifold assembly 100 includes the first valve 102 within the first passage 14 and the second valve 104 disposed within the second passage 16. Each of the first passage 14 and the second passage 16 feed into a common bore 114. The separate valves 102, 104 control the flow material through each of the first passage 14 and the second passage 16.

Referring to FIGS. 14 and 15, the valve assemblies 102, 104 are disposed within each of the first passage 14 and the second passage 16 and are independently controlled to regulate the flow of material there through. The valves 102 and 104 are illustrated schematically and are preferably solenoid operated valves, however, other valves as are known to a worker skilled in the art are also within the contemplation of this invention. Valves may be simple on, off valves or may proportionally control the flow of material through each of the passages 14, 16. Individually controlled valves provide for the proportional control of material flowing through the first passage 14 and the second passage 16.

Each of the other manifold examples illustrated and described in this application include temperature control elements in thermal contact with each of the first and second passages 14, 16 that are capable of independently controlling the temperature in each of the passages to provide for the desired and even temperature and flow of different material. The manifold assembly described and disclosed in this invention provides for the use of core materials with the higher molten temperature skin material to provide a molded article with the desirable features of the core material and the outer skin material.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A co-injection manifold assembly for injecting two different materials into a common mold cavity, said assembly comprising:
   a housing defining a first passage, a second passage and an outlet;
   a bore in communication with said first passage, said second passage and said outlet;
   a valve member moveable within said bore for controlling material flow from said first passage and said second passage, wherein said valve member comprises a pin movable axially within said bore and rotatable for selectively blocking material from said first passage and said second passage;
   a first temperature control element in thermal contact with said first passage for maintaining a first temperature within said first passage; and
   a second temperature control element in thermal contact with said second passage for maintaining a second temperature different than said first temperature within said second passage.

2. The assembly as recited in claim 1, wherein said first passage includes a first inlet for receiving a first material for forming a core of a molded article.

3. The assembly as recited in claim 2, wherein said first temperature is different than said second temperature and within a temperature range that does not adversely affect said first material.

4. The assembly as recited in claim 1, wherein said bore includes a nozzle defining an inner bore and an outer bore, wherein said second passage is in communication with said outer bore and said first passage is in communication with said inner bore.

5. The assembly as recited in claim 4, wherein said first passage includes a first opening into said bore and said second passage includes a second opening into said bore, wherein said first opening is in communication with said inner bore and said second opening is in communication with said outer bore.

6. The assembly as recited in claim 1, wherein said pin includes a radial surface comprising a shut off portion and an open portion such that rotation of said pin selectively controls material flow into said bore.

7. A co-injection manifold assembly for injecting two different materials into a common mold cavity, said assembly comprising:
   a housing defining a first passage, a second passage and an outlet;
   a bore in communication with said first passage, said second passage said outlet;
   a valve member moveable within said bore for controlling material flow from said first passage and said second passage, wherein said valve member is movable within a channel transverse to said bore for controlling communication of material between at least one of said first passage and said second passage and said outlet;

a first temperature control element in thermal contact with said first passage for maintaining a first temperature within said first passage; and a second temperature control element in thermal contact with said second passage for maintaining a second temperature different than said first temperature within said second passage.

8. The assembly as recited in claim 7, wherein said valve member includes a valve block defining a first portion for communicating material from said first passage and said second passage, a second portion for communicating material only from said second passage, and a third portion for blocking material flow from each of said first and second passages.

9. The assembly as recited in claim 1, wherein said mold cavity is disposed within a mold tool, said mold tool including a plurality of said mold cavities into which the two different materials are injected.

10. The assembly as recited in claim 9, wherein each of said plurality of mold cavities defines a different molded article.

11. A co-injection manifold assembly for injecting two different materials into a common mold cavity, said assembly comprising:
    a housing defining a first passage, a second passage and an outlet;
    a bore in communication with said first passage, said second passage and said outlet; and
    a valve member movable within a channel transverse to said bore for controlling communication of material from at least one of said first passage and said second passage to said outlet, wherein said valve member comprises a valve block defining a first portion for communicating material from said first passage and said second passage, a second portion for communicating material only from said second passage, and a third portion for blocking material flow from each of said first and second passages.

12. The assembly as recited in claim 11, including an actuator for moving said valve block within said channel for aligning one of said first, second and third portions with said outlet.

13. A co-injection manifold assembly for injecting two different materials into a common mold cavity, said assembly comprising:
    a housing defining first passage, a second passage and an outlet;
    a bore in communication with said first passage, said second passage and said outlet; and
    a valve member movable within a channel transverse to said bore for controlling communication of material from at least one of said first passage and said second passage to said outlet; and
    a first temperature control element in thermal contact with said first passage for maintaining a first temperature within said first passage and a second temperature control element in thermal contact with said second passage for maintaining a second temperature different than said first temperature within said second passage.

14. The assembly as recited in claim 13, wherein said first passage includes a first inlet for receiving a first material for forming a core of a molded article.

15. A co-injection manifold assembly for injecting two different materials into a common mold cavity, said assembly comprising:
    a housing defining a first passage, a second passage and an outlet;
    a bore in communication with said first passage, said second passage and said outlet; and
    a valve pin rotatable within said bore for controlling material flow, wherein said valve pin is movable axially within said bore and includes an outlet portion movable axially into said outlet for shutting off material flow through said outlet.

16. The assembly as recited in claim 15, wherein said valve pin includes a radial surface including a shut off portion and an open portion such that rotation of said pin selectively controls material flow.

17. The assembly as recited in claim 15, wherein said shut-off portion includes a radial surface corresponding with an inner surface of said bore for closing off material flow.

18. The assembly as recited in claim 15, wherein said open portion includes a radial surface spaced apart from an inner surface of said bore.

19. The assembly as recited in claim 16, wherein rotation of said valve pin provides a first position opening said first passage and closing said first passage, a second position opening both said first passage and said second passage, a third position opening said second passage and closing said first passage, and a forth position closing both the first passage and said second passage.

20. The assembly as recited in claim 19 wherein each of said first, second, third and fourth positions are separated by selective rotation of said valve pin.

* * * * *

UNITED STATES PATENT AND TRADEMARK OFFICE
CERTIFICATE OF CORRECTION

PATENT NO. : 7,390,184 B2  Page 1 of 1
APPLICATION NO. : 11/269935
DATED : June 24, 2008
INVENTOR(S) : Keck et al.

It is certified that error appears in the above-identified patent and that said Letters Patent is hereby corrected as shown below:

Claim 7, Column 8, line 61: Insert --and-- after "passage"

Claim 13, Column 9, line 44: Insert --a-- after "defining"

Signed and Sealed this

Second Day of September, 2008

JON W. DUDAS
*Director of the United States Patent and Trademark Office*